US012574338B2

(12) United States Patent
Rashidi et al.

(10) Patent No.: US 12,574,338 B2
(45) Date of Patent: Mar. 10, 2026

(54) MULTI-TENANT COLLECTIVE COMMUNICATION FABRIC

(71) Applicant: HEWLETT PACKARD ENTERPRISE DEVELOPMENT LP, Spring, TX (US)

(72) Inventors: Saeed Rashidi, Milpitas, CA (US); Lianjie Cao, Milpitas, CA (US); Puneet Sharma, Milpitas, CA (US); Khaled Diab, Mississauga (CA); Hardik Soni, Böblingen (DE); Faraz Ahmed, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 272 days.

(21) Appl. No.: 18/538,936

(22) Filed: Dec. 13, 2023

(65) Prior Publication Data

US 2025/0202837 A1 Jun. 19, 2025

(51) Int. Cl.
H04L 47/70 (2022.01)
H04L 47/80 (2022.01)

(52) U.S. Cl.
CPC .......... H04L 47/828 (2013.01); H04L 47/801 (2013.01)

(58) Field of Classification Search
CPC ..... H04L 47/828; H04L 47/801; H04L 67/10; G06F 15/17381; G06F 9/45558; G06F 9/505; G06F 9/5072; G06F 13/4068; G06F 13/4282; G06F 2009/45595; G06F 2213/0026
See application file for complete search history.

(56) References Cited

U.S. PATENT DOCUMENTS

| | | | | |
|---|---|---|---|---|
| 9,304,803 | B2 * | 4/2016 | Nelson | ................ G06F 9/45558 |
| 10,313,261 | B1 * | 6/2019 | Walton, III | ........... H04L 41/145 |
| 10,375,161 | B1 * | 8/2019 | Tan | ......................... H04L 49/70 |

(Continued)

OTHER PUBLICATIONS

Cai et al., "Synthesizing Optimal Collective Algorithms", Jan. 4, 2021, 13 pages.

(Continued)

*Primary Examiner* — Joe Chacko

(74) *Attorney, Agent, or Firm* — Sheppard Mullin Richter & Hampton LLP

(57) ABSTRACT

Systems and methods are provided for a multi-tenant collective communication fabric for optimal utilization of communication links between compute nodes of an interconnected system. Examples include allocating a plurality of compute nodes to a first workload and obtaining a topology of the interconnected system representative of an indirect path between the allocated compute nodes. The indirect path comprises a non-allocated compute node of the interconnected system. The examples include creating plurality of slices of resources of the non-allocated compute node, with a first slice dedicated to processing and forwarding data traffic along the indirect path and a second slice configured for allocation to a second workload. The examples also include executing the first workload by the allocated compute nodes and the non-allocated compute node, wherein data traffic from the plurality of allocated compute nodes is communicated via the indirect communication path.

20 Claims, 6 Drawing Sheets

(56)                   References Cited

U.S. PATENT DOCUMENTS

| | | | | |
|---|---|---|---|---|
| 2013/0073733 | A1* | 3/2013 | Archer | G06F 9/505 |
| | | | | 709/226 |
| 2013/0332926 | A1* | 12/2013 | Jakoljevic | G06F 9/45533 |
| | | | | 718/1 |
| 2017/0310607 | A1* | 10/2017 | Ruan | H04L 47/781 |
| 2017/0331759 | A1* | 11/2017 | Li | H04L 41/5054 |
| 2018/0006903 | A1* | 1/2018 | Ganguli | H04L 41/5019 |
| 2022/0294848 | A1* | 9/2022 | Matthews | G06N 3/09 |
| 2024/0311153 | A1* | 9/2024 | Arzani | G06F 9/4881 |

OTHER PUBLICATIONS

Luo et al., "Parameter Hub: a Rack-Scale Parameter Server for Distributed Deep Neural Network Training", Oct. 11-13, 2018, 14 pages.

Mahajan et al., "Better Together: Jointly Optimizing ML Collective Scheduling and Execution Planning using Syndicate", Proceedings of the 20th USENIX Symposium on Networked Systems Design and Implementation, Apr. 17-19, 2023, 17 pages.
Nvidia Corporation, "Nvidia collective communication library", Installation Guide, May 2021, 15 pages.
Sapio et al., "Scaling Distributed Machine Learning with In-Network Aggregation", Proceedings of the 18th USENIX Symposium on Networked Systems Design and Implementation, Apr. 12-14, 2021, 25 pages.
Shah et al., "TACCL: Guiding Collective Algorithm Synthesis using Communication Sketches", Proceedings of the 20th USENIX Symposium on Networked Systems Design and Implementation, Apr. 17-19, 2023, 21 pages.

* cited by examiner

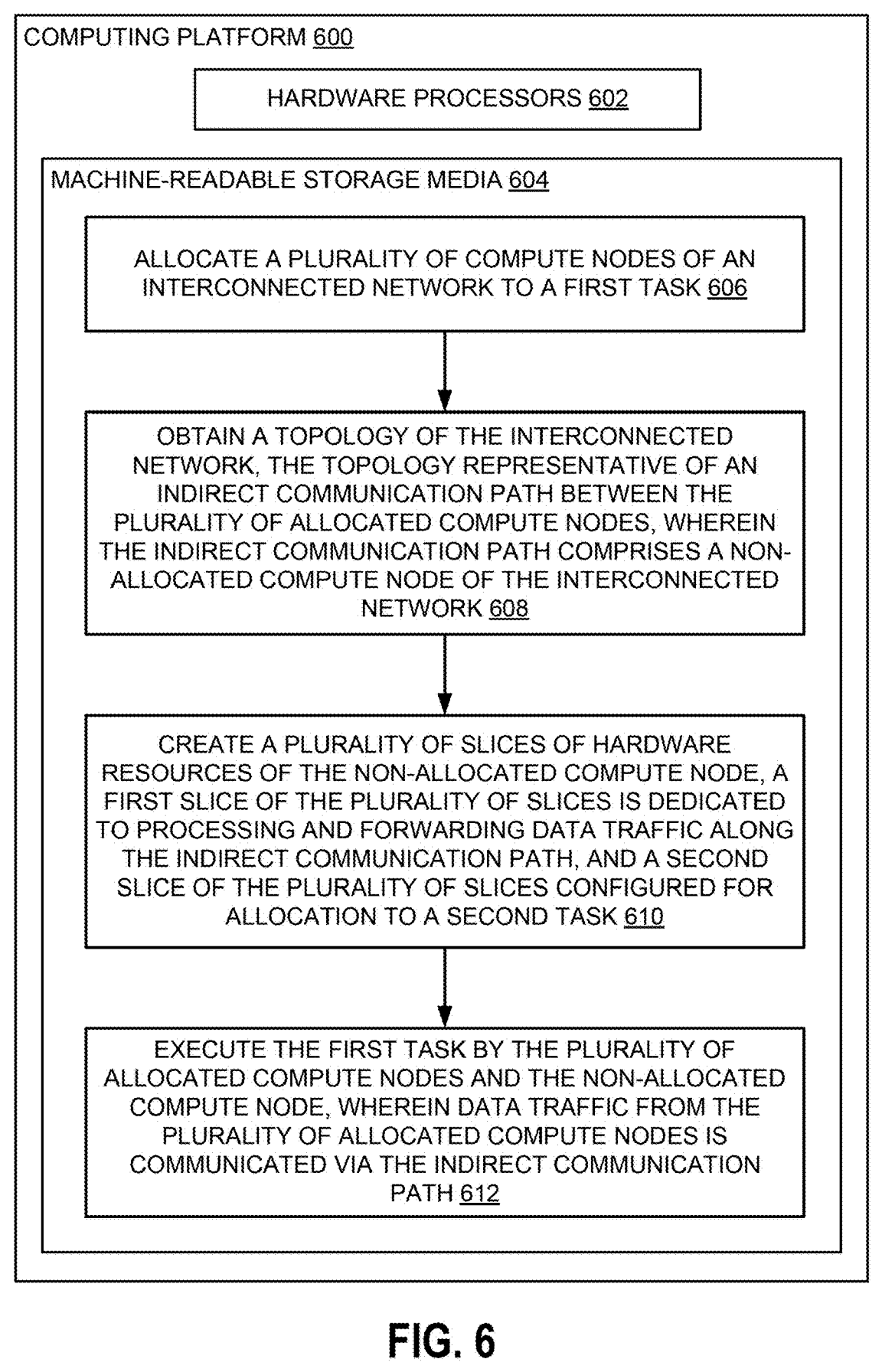

COMPUTING PLATFORM 600

HARDWARE PROCESSORS 602

MACHINE-READABLE STORAGE MEDIA 604

ALLOCATE A PLURALITY OF COMPUTE NODES OF AN INTERCONNECTED NETWORK TO A FIRST TASK 606

OBTAIN A TOPOLOGY OF THE INTERCONNECTED NETWORK, THE TOPOLOGY REPRESENTATIVE OF AN INDIRECT COMMUNICATION PATH BETWEEN THE PLURALITY OF ALLOCATED COMPUTE NODES, WHEREIN THE INDIRECT COMMUNICATION PATH COMPRISES A NON-ALLOCATED COMPUTE NODE OF THE INTERCONNECTED NETWORK 608

CREATE A PLURALITY OF SLICES OF HARDWARE RESOURCES OF THE NON-ALLOCATED COMPUTE NODE, A FIRST SLICE OF THE PLURALITY OF SLICES IS DEDICATED TO PROCESSING AND FORWARDING DATA TRAFFIC ALONG THE INDIRECT COMMUNICATION PATH, AND A SECOND SLICE OF THE PLURALITY OF SLICES CONFIGURED FOR ALLOCATION TO A SECOND TASK 610

EXECUTE THE FIRST TASK BY THE PLURALITY OF ALLOCATED COMPUTE NODES AND THE NON-ALLOCATED COMPUTE NODE, WHEREIN DATA TRAFFIC FROM THE PLURALITY OF ALLOCATED COMPUTE NODES IS COMMUNICATED VIA THE INDIRECT COMMUNICATION PATH 612

FIG. 6

MULTI-TENANT COLLECTIVE COMMUNICATION FABRIC

BACKGROUND

End-users, such as enterprises, can run applications using multi-tenant systems. These systems can consist of multiple compute nodes (e.g., CPUs and GPUs) arranged according to intra-system physical device topologies. The physical device topologies can be realized using various communication link protocols, such as but not limited to, Peripheral Component Interconnect Express (PCIe) and NVLink. Inter-system physical topologies can connect multiple systems via high-speed networking communication links.

Multi-tenant systems can assist with executing applications. Executing an application may include performing a number of computation workloads. Each workload can consume system resources, such as memory and time. Multi-tenant systems can be used to accelerate the performance of an application by allocating multiple compute nodes to a workload. Different applications and different workloads can be distributed across a single multi-tenant system by allocating compute nodes to different applications and workloads. As such, system resources of the multi-tenant system can be shared among multiple applications.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 6 is an example computing component that may be used to implement various features of multi-tenant collective communication in distributed computing in accordance with the implementations disclosed herein.

Figure 1:
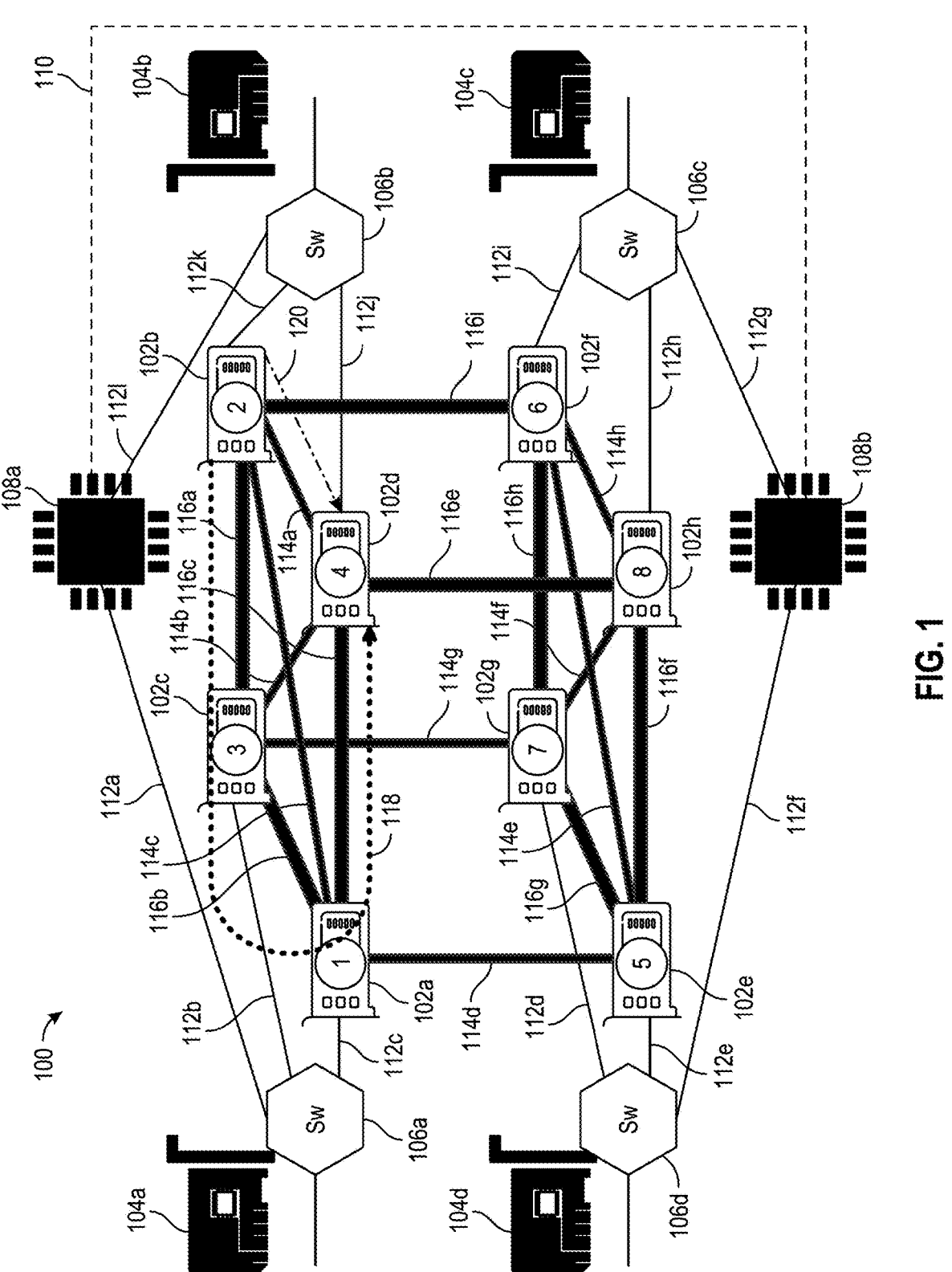
FIG. 1 is a schematic block diagram of a physical device topology of an interconnected compute system in accordance with implementations of the present disclosure.

The figures are not exhaustive and do not limit the present disclosure to the precise form disclosed.

DETAILED DESCRIPTION

Recent advancements in artificial intelligence (AI) and machine learning (ML) have revolutionized not only the technology industry but also everyday lives. Increasingly complex ML models have been developed across various subject matter domains that can enable increasing powerful applications. As an example, GPT (Generative Pre-trained Transformer) models have been developed in a natural language processing (NLP) domain, which drive ChatGPT like services. These GPT models have evolved in complexity from 117 million parameters to 175 billion parameters.

Training such massive ML models may go beyond the capabilities of a single compute node (e.g., central processing unit (CPU), a graphical processing unit (GPU), a tensor processing unit (TPU), or the like) or even a single interconnected system of multiple compute nodes. To expedite an ML training process, distributed training has been introduced that can divide a training workload into sub-workloads (referred to herein as tasks) through various forms of parallelism, such as but not limited to, data parallelism, pipeline parallelism, tensor parallelism, and the like. Each task can be assigned to a distinct compute node of the interconnected system. The training results from different compute nodes can be collected and synchronized. Exchange of training results among multiple compute nodes can be achieved through collective communications, for example, message passing interface (MPI) and NVIDIA based collective communications. For example, NVIDIA Collective Communications Library (NCCL) offers several inter-GPU communication primitives, including All-Reduce, Broadcast, Reduce, All-Gather, Reduce-Scatter, to name a few. Other example libraries include, but are not limited to, Radeon Open Compute (ROCm) Communication Collective Library (RCCL) and Microsoft Collective Communication Library (MSCCL), both of which are aimed at achieving similar goals as the NCCL. For instance, MSCCL can build on top of NCCL to provide a flexible and programmable interface to implement collective algorithms.

The aforementioned interconnected systems can offer benefits to end-users in executing applications. For example, a pay-as-you-go model, in which an end-user pays for each workload executed on an interconnected system, can reduce the total cost of ownership (TCO) for a given end-user across a range of applications and access patterns relative to operating their own dedicated proprietary system. Further, an interconnected system can offer various services that end-users can deploy, which may assist to decrease time-to-market relative to a proprietary dedicated system. Additionally, interconnected systems can support dynamic scaling of services that enable end-users to handle varying patterns of system access. The interconnected systems can also offer different accelerators such as GPUs (e.g., NVIDIA and AMD) and FPGAs (e.g., AMD Xilinx) to end-users that may otherwise be difficult to deploy and manage.

With the growth in computing power, ML models, and data, communication between compute nodes may become a performance bottleneck in distributed training of ML models. Various approaches have been proposed to establish high-speed interconnects among compute nodes of interconnected systems. However, many of these interconnects may be costly and can be limited to a small number of compute nodes of specifically designed physical device topologies. For instance, the NVIDIA DGX-1 system can employ a specifically designed hybrid cube-mesh topology with multiple NVLinks that connect up to 8 GPUs on the same host.

To optimize communication performance, collective communication libraries may leverage physical device topologies to create logical topologies (sometimes referred to herein as virtual topologies) between the compute nodes allocated to a workload. A collective communication library (e.g., NCCL, RCCL, MSCCL, etc.) can be used to generate various logical topologies (e.g., ring topology, tree topology, etc.) from the physical device topology to achieve enhanced communication performance based on a communication primitive type (e.g., All-Reduce, Broadcast, Reduce, All- Gather, Reduce-Scatter, etc.) and available interconnect links of the physical device topology.

However, the formation of logical topologies by these conventional collective communication libraries may be limited by the physical device topology. These approaches may be limited to using only those compute nodes allocated for a particular workload and direct connections therebetween to construct a logical topology. For example, a logical topology may not be established by the conventional approaches where direct links between allocated compute nodes are not available. In another example, communication links that provide the direct connection may have a lower bandwidth and lower data transfer rates than an indirect path. However, as the conventional approaches may be limited to only direct connections, the resulting the logical topology may be limited to the slower direct path.

As a result of the aforementioned restrictions, indirect connections may be underutilized in logical topologies that may otherwise improve communication performance. The impact of the above restrictions may be amplified in multi-tenant systems with heterogeneous infrastructures. For example, heterogeneous infrastructures may comprise compute nodes of varying computation power and links of varying speeds (e.g., data transfer rates) that are shared and allocated by different workloads. Certain compute nodes and links may go underutilized or remain idle, while other compute nodes and links may be oversubscribed. As a result, overall system utilization may be reduced, which may increase the TCO because system resources may be stranded and may limit system performance, such as its throughput and end-to-end delay.

Accordingly, the present disclosure provides for a multi-tenant collective communication fabric (MCCF) that may enhance collective communication performance through optimal utilization of available communication links between compute nodes of an interconnected system. The technology of the present disclosure can overcome the above technical shortcomings by leveraging any available communication link, whether a direct or an indirect connection, to provide for improved communication performance. The disclosed technology may be well suited to multi-tenant systems where, as noted above, infrastructure of varying compute nodes and data transfer rates may be shared by varying workloads. The disclosed technology can leverage the varying data transfer rates for improving communication performance between selected compute nodes.

For example, an interconnected system of compute nodes can be used for collective communication, in which a number of compute nodes of the interconnected system can be allocated to perform a workload. The workload can be divided into tasks, each of which can be allocated to a compute node. A task that has been allocated to a compute node may be considered as a "tenant" of that compute node. A compute node may refer to a CPU, a GPU, a TPU, a Smart network interfacing controller (e.g., NICs that can perform custom compute and communication tasks), servers, and any other computation device that can be configured to perform an allocated computation task. These compute nodes can be interconnected via a network of communication links forming a communication fabric. The communication links can include links capable of different speeds (e.g., different data transfer rates). Thus, for example, a first compute node can be connected to other compute nodes via communication links of a first data transfer rate, while a second compute node can be connected to other compute nodes via communication links of a second data transfer rate. The second data transfer rate may be faster than the first data rate. In some cases, a communication link may not exist that directly connects one compute node to another.

According to examples of the present disclosure, a plurality of compute nodes of an interconnected system can be allocated to a workload and a logical topology of the interconnected system can be obtained. The interconnected system may comprise a physical device topology that can be logically represented by the logical topology. In various examples, the logical topology may comprise an indirect communication path between the plurality of compute nodes. An indirect communication path, according to the present disclosure, may comprise one or more indirect communication links forming connections between a plurality of allocated compute nodes and includes at least one intermediate compute node communicatively connected between the plurality of allocated compute nodes. As used herein, an indirect communication link may refer to a communications link that connects an allocated compute node to another, non-allocated compute node (e.g., an intermediate compute node), prior to connecting to another allocated compute node. For example, two allocated compute nodes may be directly connected to each other via a low-speed link, and indirectly connected by high speed links via one or more intermediate, non-allocated compute nodes. In this case, an optimal communication path, in terms of data transfer speeds and system resources, may utilize the higher speed indirect communication links opposed to the lower speed direct communication link.

Use of the indirect communication links may be provided, according to examples of the present disclosure, by partitioning hardware resources (e.g., memory and computation resources) on the at least one intermediate compute node. For example, hardware resources of a compute node may be logically partitioned to form slices of hardware resources. The slices may be assigned functions according to a desired operation. In an illustrative example, the slices may include a first slice dedicated to processing and forwarding data traffic along the indirect communication path and a second slice that can be allocated to tenants (e.g., executing workload tasks).

As outlined above, examples of present disclosure can execute a workload on a plurality of allocated compute nodes via an indirect communication path. As such, data can be transferred between allocated compute nodes using an indirect communication link that may comprise communications links capable of higher data transfer rates as compared to a direct communication link. For example, a first allocated compute node may execute an allocated task of the workload and generate resultant data. The resultant data can be communicated to a second allocated compute node via an indirect communication path. By leveraging the indirect communication path, a non-allocated compute node can receive data traffic comprising the resultant data and forward the data traffic to the second allocated compute node for use in executing the task allocated to the second compute node. At the same time, the second slice of the non-allocated compute node can be available for allocation to another task (tenant) of the same or different workload.

Thus, implementations of the present disclosure can provide for optimal utilization of system resources within an interconnected system, while also providing for multiple tenant utilization of compute nodes. Unlike prior approaches, the technology of the present disclosure can build a virtual topology for a particular workload that spans both allocated and non-allocated compute nodes and the communication links therebetween. The disclosed examples can provide for selection of any compute node in a physical device topology for allocation of system resources. This can be achieved through the slicing hardware resources of a compute node and assigning a sub-set of the slices for computing and forwarding functions of workload related data. Other slices may also be leveraged to simultaneously allocate a task of another workload to the compute node.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1 is a schematic block diagram of a physical device topology of an interconnected compute system 100 in accordance with implementations of the present disclosure. Interconnected compute system 100 is an example of a multi-tenant system that can be utilized to execute one or more workloads. The workload(s) may be attributed to a single end-user (e.g., a customer, organization, enterprise, etc.) or multiple end-users.

Interconnected compute system 100 comprises a plurality of compute nodes that can be connected according to physical device topology shown in FIG. 1. The plurality of compute nodes may comprise various types of compute nodes, such as but not limited to, CPUs, GPUs, Smart NICs, TPUs, or the like. In the example of FIG. 1, interconnected compute system 100 comprises a first plurality of compute nodes 102*a*-102*h* (collectively referred to herein as first compute nodes 102) provided as a first type of compute node, a second plurality of compute nodes 108*a*-108*b* (collectively referred to herein as second compute nodes 108) provided as a second type of compute node, and a third plurality of compute nodes 104*a*-104*d* (collectively referred to herein as third compute nodes 104) provided as a third type of compute node. In the illustrative example of FIG. 1, first compute nodes 102 are provided as GPUs, second compute nodes 108 are provided as CPUs, and third compute nodes 104 are provided as Smart NICs.

The interconnected compute system 100 also comprises a plurality of communication links. In the example of FIG. 1, interconnected compute system 100 comprises a first plurality of communication links 114*a*-114*h* (collectively referred to herein as first communication links 114), a second plurality of communication links 116*a*-116*i* (collectively referred to herein as second communication links 116), and a third plurality of communication links 112*a*-1121 (collectively referred to herein as third communication links 112). Communication link 110 may be an example of a dedicated bus that connects second compute nodes 108, for example, an Ultra Path Interconnect (UPI) or a QuickPath Interconnect (QPI).

The plurality of communications links can comprise varying speeds (e.g., bandwidth, data transfer rates, etc.). In the example of FIG. 1, communication links 114 may be configured for a first data transfer rate, communication links 116 may be configured for a second data transfer rate, and communication links 112 may be configured for a third data transfer rate. In an example implementation, the second data transfer rate may be faster than the first data transfer rate, and the first data transfer rate may be faster than the third data transfer rate.

In the example of FIG. 1, the physical device topology of interconnected compute system 100 comprises two physical sub-topologies: a first sub-topology configured to support data transfers between compute nodes 104 and compute nodes 102 and a second sub-topology configured to support data transfers between compute nodes 102. The first sub-topology may be implemented via communications links 112 and switches 106*a*-106*d* (collectively referred to herein as switches 106). The second sub-topology may be implemented via communications links 114 and 116 that form interconnects between compute nodes 102.

In examples, communication links may be realized using one or more protocols, such as but not limited to, PCIe and NVIDIA NVLink. In an illustrative example, the third communication links 112 may be implemented as PCIe links and switches 106 may be implemented as PCIe switches. Further, communication links 114 and 116 may be implemented as NVLinks. According to various implementations, NVLinks may be capable of higher data transfer rates relative to data transfer rates achieved by PCIe links. Furthermore, in this illustrative example, the NVLinks of communication links 114 may have data transfer rates of 25 GB/s, while each communication link 116 may comprise two NVLinks that provide data transfer rates of 50 GB/s.

In the example of FIG. 1, the first sub-topology may comprise the third plurality of compute nodes 108. The third plurality of compute nodes 108 may provide for inter-system connections, for example, between compute nodes 108*a* and 108*b*. In the case of interconnected compute system 100, the third plurality of compute nodes 108 may be provided as NICs connected to the third plurality of compute nodes 104 via communications links 112 and connected to each other via communication link 110. For example, as shown in FIG. 1, compute node 108*a* may be connected to compute node 104*a* via switch 106*a* and communication link 112*a*, and to compute node 104*b* via switch 106*b* and communication link 1121. Compute node 108*b* may be connected to compute node 104*d* via switch 106*d* and communication link 112*f*; and to compute node 104*c* via switch 106*c* and communication link 112*g*.

While a specific physical device topology is depicted in FIG. 1, the present disclosure is not limited to this specific topology. Other physical device topologies may be utilized within the scope of the present disclosure, as long the physical device topology comprises a plurality of compute nodes connected via a plurality of communications links to form an interconnected compute system. For example, the number of GPU implemented can be decreased or increased. Furthermore, a sub-set of the GPUs may be provided with full connectivity each other (e.g., all-to-all connectivity). In an illustrative example, an interconnected system may be provided that consists of sixteen GPUs, where every eight GPUs may be deployed to one of two GPU boards. The two GPU boards (and corresponding GPUs) can be interconnected via NVSwitches using eight NVLinks between every two NVSwitches. This configuration may support up to eight 100 Gbp/s NICs. These GPUs might be connected to additional GPUs through the NIC network.

The physical device topologies implemented may be specifically configured to achieve certain throughput, delay, and connectivity objectives of the topology desired by an operator of the topology. For example, NVSwitch-based topologies may realize full connectivity among GPU compute nodes without a need to go through slower PCIe links, such as in the example shown in FIG. 1.

In examples, interconnected compute system 100 can allocate system resources to workloads based on resource allocation policies. System resources may comprise computation resource provided by the compute nodes (e.g., hardware resources of the compute nodes) and networking resources such as communication bandwidth offered by the communication links. Resource allocation policies can provide for provisioning system resources to achieve desired objectives of a given system operator, such as but not limited to, throughput and end-to-end delay. The resource allocation policies may be used to assign (e.g., allocate) one or more compute nodes and a plurality of communication links to a particular workload. Resource allocation policies may be managed and executed by a controller (not shown in FIG. 1), which may be a centralized controller or a distributed controller. Further details regarding operations of an example controller are described below in connection with FIGS. 2-4.

Sharing of system resources can enable multiplexing of system resources across a number of different workloads. For example, different workloads can be allocated to various compute nodes of interconnected compute system 100 to share the system resources. Sharing of computation resources may be achieved, for instance, by running CPU virtualization technologies (e.g., kernel-based virtual machine (KVM), Xen, HyperV, Amazon Web Services (AWS) Firecracker, and the like) and GPU sharing technologies (e.g., Multi-Process Service (MPS), Multi-Instance GPU (MIG), etc.). Sharing of networking resources can be provided by running network virtualization protocols, such as but not limited to, virtual local area network (VLAN) and virtual extensible local area network (VXLAN). The network virtualization protocols can operate to provision a network slice for each workload, where each network slice comprises different networking elements (and a bandwidth share for each network element) and spans allocated compute nodes.

Although the aforementioned technologies can provide for provisioning and allocation of system resources of interconnected compute system 100, they may fall short in realizing optimal utilization of the system resources. For example, workloads allocated to compute nodes may exhibit complex communication patterns across the interconnected compute system 100 while the allocated compute nodes perform their respective tasks. As an illustrative example with reference to FIG. 1, consider a group of N compute nodes 102, where N is an integer greater than one, allocated for execution of a workload (e.g., an ML training workload). The workload may comprise one task or multiple tasks that can be executed in parallel and/or in sequence, where each task may be allocated to a distinct compute node 102 of the N compute nodes 102. Within the allocated N compute nodes 102, there may be subset of M compute nodes, where M is an integer that is equal to or less than N, which may need to exchange data to execute their respective tasks.

This exchange of communications between the subset of M compute nodes 102 may be referred to herein as collective communication. Collective communication can be used to represent various communication patterns that may appear within an interconnected compute system, such as interconnected compute system 100, for different workloads. Implementations disclosed herein can apply collective communications according to various patterns, for example, but not limited to, an All-to-All collective, in which a number of allocated compute nodes can communicate its data to each of the number of allocated compute nodes; an All-Reduce collective, in which a number of allocated compute nodes may apply an aggregation function (e.g., summation) while communicating the resulting values to each of the number of allocated compute nodes; Broadcast collective, in which an allocated compute node can distribute its data to a number of other allocated compute nodes; Reduce collective, in which data from a number of allocated compute nodes can be combined via an aggregation function and provided to an allocated compute node; Gather collective, in which data from a number of allocated compute nodes can be provided to an allocated compute node; All-Gather, in which data from a number of allocated compute nodes can be gathered at each of the number of allocated compute nodes; and Scatter collective, in which data on an allocated compute node can be split and distributed to a number of the allocated compute nodes.

As described above, in executing the above communication collectives, conventional systems may be limited to only those compute nodes and communications links allocated to a particular workload. As such, processing and data transfer of data traffic for the workload can be constrained to the allocated compute nodes and direct connections therebetween. This constraint may be enforced even if other compute nodes of interconnected system are idle or are underutilized. This limitation may lead to reduced system utilization, increased TCO due to stranding of system resources, and limits on expected application performance, such as, but not limited to, throughput.

To illustrate the above mentioned potential performance issues, a conventional implementation will be described with reference to FIG. 1. In the illustrative example, interconnected compute system 100 comprises eight first compute nodes 102 interconnected via communication links 114 and 116, which may have heterogeneous speeds. For example, communication links 114 may have a first data transfer rate (e.g., 25 GB/s) and communication links 116 may have a second data transfer rate (e.g., 50 GB/s). The data transfer rates referred to herein are for illustrative purposes only, other data transfer rates are possible depending on the actual physical device topology used.

In this example, a controller, based on resource allocation polices, may allocate compute nodes 102b and 102d for a workload. The controller may execute a communication collective between compute nodes 102b and 102d to create a logical topology. Under conventional approaches, the communication collective may utilize only the communication link 114a that directly connects allocated compute node 102b to allocated compute node 102d, shown as direct communication path 120. However, multiple indirect communication paths may exist between compute node 102b and compute node 102d. At least some of which may be capable of increased data transfer rates relative to the direct communication path. For example, indirect communication path 118 connects compute node 102b to compute node 102d via non-allocated compute nodes 102c and 102a. Indirect communication path 118 comprises communications links 116a, 116b, and 116c, each of which is capable of a higher data transfer rate than communication link 114a. Compute nodes 102c and 102a may be idle or underutilized and as such the conventional approaches may miss opportunities for improved performance in terms of data exchange speeds.

Accordingly, implementations disclosed herein provide for improved performance in collective communication through utilization of any available communication links between allocated compute nodes. For example, implementations disclosed herein may be configured to identify an optimal communication path, whether consisting of direct and/or indirect communications links, to provide for improved performance for accelerated workload execution.

For example, with reference to the above example, the implementations disclosed herein may provide functionality that permits use of indirect communication path 118 for building a virtual topology for executing a workload in a manner that provides optimal utilization of system resources. For example, idle or underutilized compute nodes can be leveraged for executing certain processes and forwarding data along high-speed communication links to permit optimal bandwidth utilize among the compute nodes. The present disclosure may achieve this functionality through slicing the compute nodes and running computation and forwarding services on the slices to forward and process data traffic via communication links other than only those allocated for a workload. Additional details of slicing the compute nodes are provided below in connection with FIGS. 2 and 5.

Figure 2:
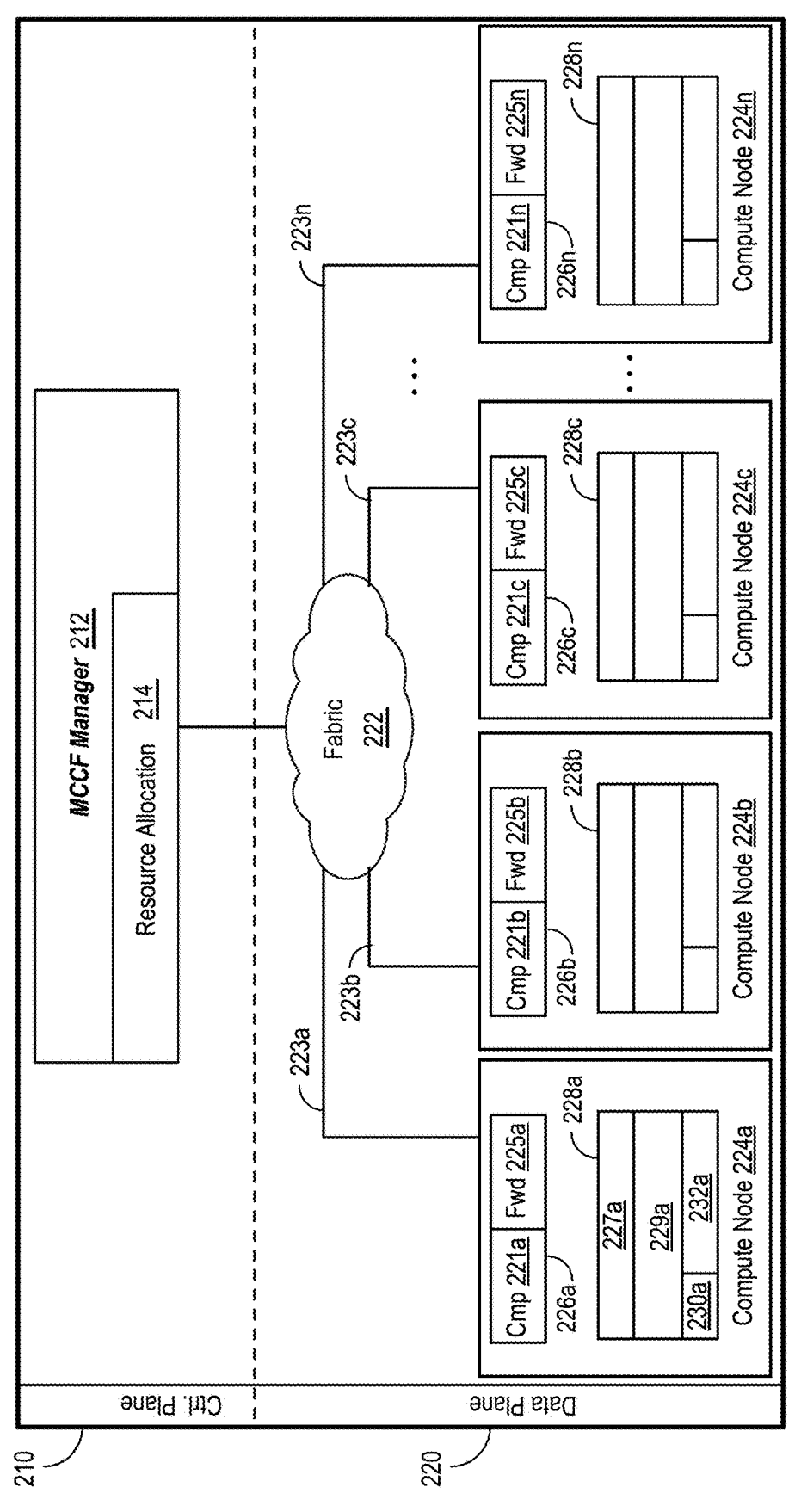
FIG. 2 is a schematic block diagram of an example architecture of a multi-tenant collective communication fabric in accordance with the present disclosure.

FIG. 2 is a schematic block diagram of an example architecture of a multi-tenant collective communication fabric (MCCF) 200 in accordance with the present disclosure. MCCF 200 comprises a plurality of components, each of which may be implemented as computer system 700 of FIG. 7. MCCF 200 comprises a control plane 210 and a data plane 220.

The control plane 210 may comprise an MCCF Manager 212 configured to execute, for each workload, a resource allocation policy of resource allocation policies 214. MCCF Manager 212 may store the resource allocation policies 214 in a memory or other data storage device. The MCCF Manager 212 may be configured to assign one or more compute nodes (referred to as allocated compute nodes) and communication links to a particular workload according to the resource allocation policy 214. The MCCF Manager 212 may also be configured to build a virtual topology from a physical device topology of an interconnected system (e.g., interconnected compute system 100) based on the allocated one or more compute nodes for the particular workload. The virtual topology may comprise a plurality of allocated compute nodes and direct communication links therebetween, as well as one or more non-allocated compute nodes of the interconnected system and indirect communication links between the one or more non-allocated compute nodes and the plurality of allocated compute nodes. According to some examples, MCCF Manager 212 may be an example of a controller referred to above in connection with FIG. 1.

The data plane 220 comprises the physical device topology of an interconnected system, such as interconnected compute system 100 of FIG. 1. Data plane 220 may comprise a plurality of compute nodes 224a-224n (collectively referred to herein as compute nodes 224) and communication links 223a-223n (collectively referred to herein as communication links 223) of the interconnected system. The compute nodes 224 can be interconnected via a network of communication links 223 forming a communication fabric 222. Compute nodes 224 may be implemented as of any of the compute nodes of FIG. 1, such as first compute nodes 102, 104, and/or 108. Communication links 223 may be implemented as any of the communication links of FIG. 1, such as third communication links 112, 114, and/or 116. In various examples, the data plane 220 may be wired connected to MCCF Manager 212 via a communication link. In some examples, the data plane 220 may be wirelessly connected to MCCF Manager 212.

According to various examples, the MCCF Manager creates a plurality of slices at each compute node 224. For example, the MCCF Manager 212 may logically partition hardware resources (e.g., computation and memory resources) of each compute nodes 224 to form the plurality of logical slices (referred to herein as slices) of hardware resources. As an illustrative example, MCCF Manager 212 forms a first slice 226a (sometimes referred to herein as a MCCF slice) and a second slice 228a (sometimes referred to herein as a tenant slice) by partitioning hardware resources of compute node 224a.

MCCF Manager 212 may assign certain functionality to the slices 226a and 228a. For example, the first slice 226a may be dedicated to execute non-tenant services of the MCCF (referred to herein as MCCF services). In the example of FIG. 2, MCCF services include, but are not limited to, computation services 221a that can be configured for processing data traffic of a workload, and forwarding services 225a that can be configured for passing the data traffic to a next compute node. In various examples, an MCCF service may be executed by compute node 224a when compute node 224a is included in a virtual topology for a particular workload and is not one of the allocated compute nodes (e.g., compute node 224a is a non-allocated compute node).

The second slice 228a may be assigned by MCCF Manager 212 to logic for performing tasks of one or more workloads allocated to the compute node 224a. In this case, the tasks allocated to the second slice 228a may be for a workload that is different from the particular workload for which compute node 224a is a non-allocated compute node. Thus, compute node 224a may be able to capable of performing operations related to multiple workloads (e.g., multiple tenants). Resources of the second slice 228 may be further partitioned into a plurality of sub-slices 227a, 229a, 230a, and 232a. These sub-slices may be allocated to different tasks of one or more workloads. In this way, second slice 228a of compute node 224a may be allocated to one or more workloads, while first slice 226a can be available for MCCF services.

While the foregoing example was described with reference to compute node 224a, the other compute nodes 224b-224n may be similar to compute node 224a. For example, compute node 224b may be partitioned into first slice 226b and second slice 228b, which may be further partitioned to sub-slices. Similarly, compute nodes 224c through compute node 224n may be partitioned into first slices 226c through 226n and second slices 228c through 228n.

Figure 3:
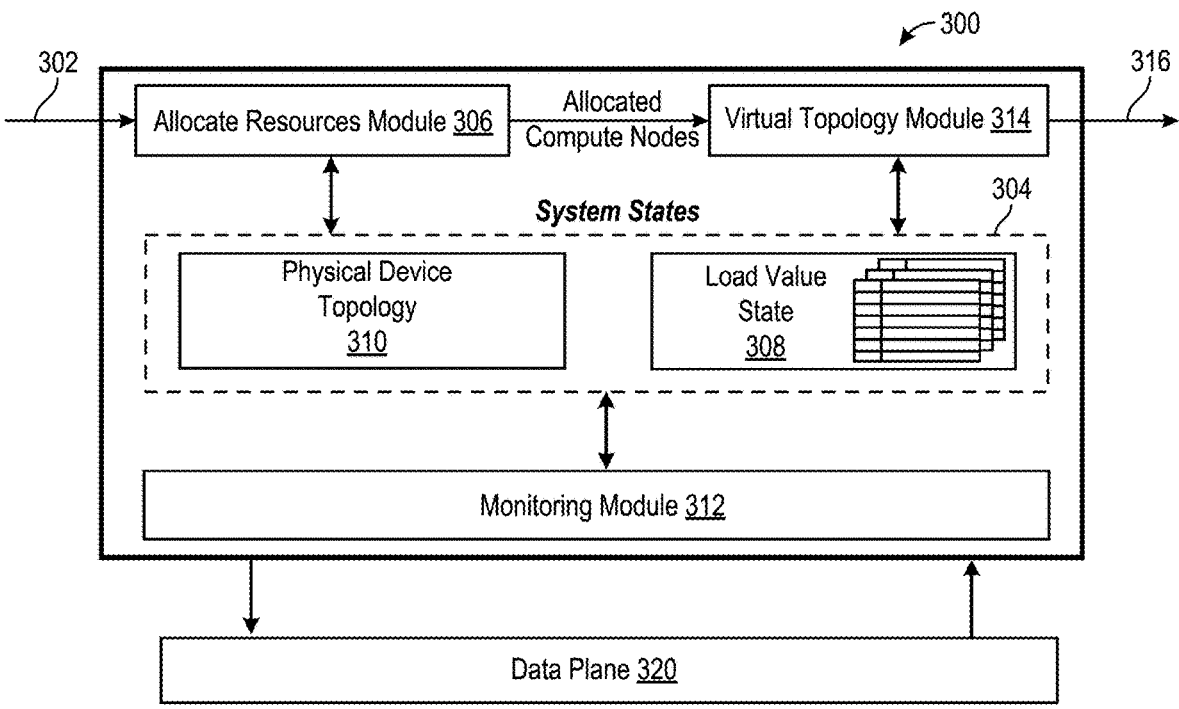
FIG. 3 is a schematic block diagram of an example MCCF controller in accordance with the present disclosure.

FIG. 3 is a schematic block diagram of an example MCCF Manager 300 in accordance with the present disclosure. MCCF Manager 300 may be an example of MCCF Manager 212 of FIG. 2. As described above, the MCCF Manager 300 runs in a control plane of MCCF (e.g., control plane 210 of MCCF 200). According to various examples, MCCF Manager 300 may receive a resource allocation request 302 from an end-user, allocate one or more compute nodes to the workload based on resource allocation policies by allocate resource module 306, and create a virtual topology to run the workload based on the allocated compute nodes by virtual topology module 314. According to various examples, the virtual topology may comprise at least one non-allocated compute node and indirect communication links.

According to some examples, MCCF Manager 300 may maintain system states 304 for an interconnected system, such as interconnected compute system 100. The system states 304 may be held in a database or other storage device. For example, system states 304 may include a physical device topology 310 and load value states 308 for each compute node and communication link of an interconnected system. An example of a physical device topology is provided above in connection with FIG. 1. The physical device topology 310 may include identifiers for each compute node, information representing computation resources of each compute node, identification of each communication link, identification of which compute nodes are connected to each communication link, and data transfer rates of each communication link. Load value states 308 may represent system resource utilization, for example, by any workloads allocated to the interconnected system (if any). In some examples, load value states 308 may include measurements of resource utilization at each compute node and communication link, such as but not limited to, computation resource utilization, available computation resource, available network resource, network resource utilization, etc. The measurements may be provided as percentages of a total amount of a respective resource. The load value states 308 may be provided as a data structure or table of compute nodes and load values for each associated compute node.

The system states 304 may be refreshed and updated by the MCCF Manager 300 by monitoring module 312. Monitoring module 312 may be configured to monitor a data plane 320 (e.g., an example of data plane 220 of FIG. 2) and obtain current system states from the physical device topology of an interconnected system. For example, the monitoring module 312 can communicate with each compute node (e.g., compute nodes 102, 104, and/or 106), through vendor-specific application programming interface (APIs), to get respective compute and communication utilization.

FIG. 3 also depicts an example workflow of the MCCF Manager 300. The example workflow will be described below with reference to FIG. 1. More particularly, the workflow of MCCF Manager 300 will be described for creating a virtual topology using indirect communication path 118 shown in FIG. 1, as an illustrative example.

The MCCF Manager 300 may receive a resource allocation request 302 from an end-user. Resource allocation request 302 may contain information, such as metadata, requesting resources for executing a workload. In an example, resource allocation request 302 may include information indicative of a number of compute nodes requested for a workload. In some examples, resource allocation request 302 may include information indicative of communication criteria between the requested compute nodes for the workload. The communication criteria may be, for example, a minimum network bandwidth requirement.

MCCF Manager 300 may execute the allocate resource module 306 to allocate compute nodes according to resource allocation request 302. For example, allocate resource module 306 may reference resource allocation policies (e.g., an example of resource allocation policies 214 of FIG. 2) and obtain current system states from system states 304. Allocate resource module 306 may allocate specific system resources for the workload referenced in resource allocation request 302, e.g., compute node 102b and compute node 102d, based on the allocation resource policies and current system states. In the above example, resource allocation request 302 may have requested two compute nodes for a particular workload, and the allocate resource module 306 may select certain compute nodes according to the resource allocation polices and current system states. For example, the allocate resource module 306 may maintain a list of the least utilized compute nodes and network resources. The allocate resource module 306 may then execute an algorithm to exhaustively iterate through the list to determine a selection of compute nodes (and available direct and indirect communication path between them) that meets the request or not. The allocate resource module 306 may then reserve compute and memory slices on each selected compute node using the resource sharing methods (e.g., Multi-Instance GPUs (MIG) and the like as known in the art).

The MCCF Manager 300 may execute the virtual topology module 314 to facilitate generating a virtual topology for performing the workload using the allocated compute nodes. Virtual topology module 314 may create virtual topology based on various objectives, examples of which are described below. For example, using the allocated compute nodes, the virtual topology module 314 may identify direct communication paths between allocated compute nodes, data transfer rates therebetween, and network resources utilization of the communication paths. Virtual topology module 314 may also identify indirect communication paths between the allocated compute nodes, data transfer rates of the communication links forming the indirect communication path, and network resources utilization thereof. Virtual topology module 314 may then calculate an optimal communication path in terms of data transfer rates from the direct and indirect communication paths based on the objectives described below. In some examples, virtual topology module 314 may perform graph-based analysis, such as but not limited to, minimum cost maximum flow analysis, to calculate the optimal communication path(s) for the virtual topology. The computation may also consider computation resource utilization at non-allocated compute nodes so to identify underutilized or idle compute nodes that may be optimal, in terms of resource utilization, for performing MCCF services.

There may be various objectives that virtual topology module 314 may consider when building a virtual topology. An example objective may be to balance resource load (e.g., utilization) among compute nodes and communication links of the interconnected system. For example, non-allocated compute nodes and related communication links may be selected to balance system wide load. Another example objective may be to enforce quality of service (QOS) requirements, such as but not limited to, minimizing end-to-end delay, maximizing throughput, or maximizing time to solution within a time budget. As another example objective, virtual topology module 314 may have fine-grained control over the types of communication links to be utilized. For example, the virtual topology module 314 may decide to leverage high-speed links for specific tasks over slower links. The above objective are non-exhaustive examples, other objectives may be taken into account by virtual topology module 314 in building a virtual topology.

Once virtual topology module 314 creates the virtual topology, the MCCF Manager 300 may configure the physical device topology for performing the workload according to the virtual topology. For example, MCCF Manager 300 may transmit allocation control 316 that comprises instructions to assign resources of the physical device topology to the workload according to the virtual topology. In an illustrative example, workload tasks can be assigned to tenant slices of allocated compute nodes, while MCCF slices of unallocated compute nodes can be allocated for performing MCCF services. Additional details are provided below in connection with FIG. 5.

Figure 4:
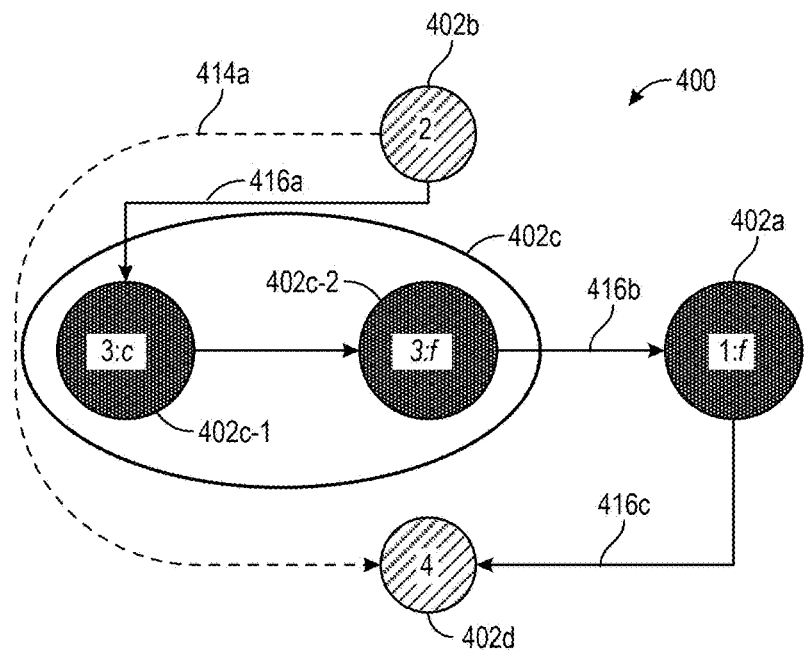
FIG. 4 depicts an example virtual topology in accordance with an example implementation of the present disclosure.

FIG. 4 depicts an example virtual topology 400 in accordance with an example implementation of the present disclosure. Virtual topology 400 is a schematic representation of a virtual topology computed by an MCCF Manager (e.g., virtual topology module 314).

In the example of FIG. 4, the virtual topology 400 comprises the allocated compute nodes 402b and 402d, as well as non-allocated compute nodes 402c and 402a. With reference to FIG. 1, the allocated compute nodes 402b and 402d may be virtual representations of compute nodes 102b and 102d, respectively. Non-allocated compute nodes 402c and 402a may be virtual representations of compute nodes 102c and 102a, respectively. The non-allocated compute nodes 402c and 402a may be dedicated for computation and forwarding services (e.g., MCCF services).

The virtual topology 400 also comprises communication links 416a-416c that collectively form an indirect communication path. The communication links 416a-416c can be used for performing forwarding services (e.g., MCCF services). With reference to FIG. 1, the communication links 416a-416c may be virtual representations of communication links 116a-116c. FIG. 4 also depicts an direct communication path 414 determined from the allocate resource module 306. Direct communication path 414 may be an example of communication link 114a of FIG. 1. As described above, communication links 116 may have a higher data transfer rate than communication links 114. As such, the virtual topology may be created according to the indirect communication path to provide improved data transfer rates as compared to the direct communication path.

As described above, each compute node can be partitioned into slices. FIG. 4 also schematically depicts which slice is utilized by each compute node. For example, compute nodes 402b and 402d are depicted with a first hatch pattern that represents that the compute nodes 402b and 402d are allocated to performing a task of the workload (e.g., tenant slices execute respective tasks). Whereas, compute nodes 402c and 402a comprise a second hatch pattern that represent that MCCF slices are dedicated to MCCF services.

Each compute node 402c and 402a also comprises information indicating which MCCF services are performed by the respective compute node. For example, compute node 402c may perform computation services 402c-1 and forwarding services 402c-2 and compute node 402c may perform forwarding services. In some examples, non-allocated compute nodes 402c may execute the services by running a compute kernel (e.g., 3:c) and a forwarding kernel (e.g., 3:f) to transfer data to non-allocated compute nodes 402a, while non-allocated compute nodes 402a may run a forwarding kernel (e.g., 1:f) to transfer data to allocated compute nodes 402d. The computation services and forwarding services of FIG. 4 may be examples of computation services 221a and workload and forwarding services 225a, respectively.

Figure 5:
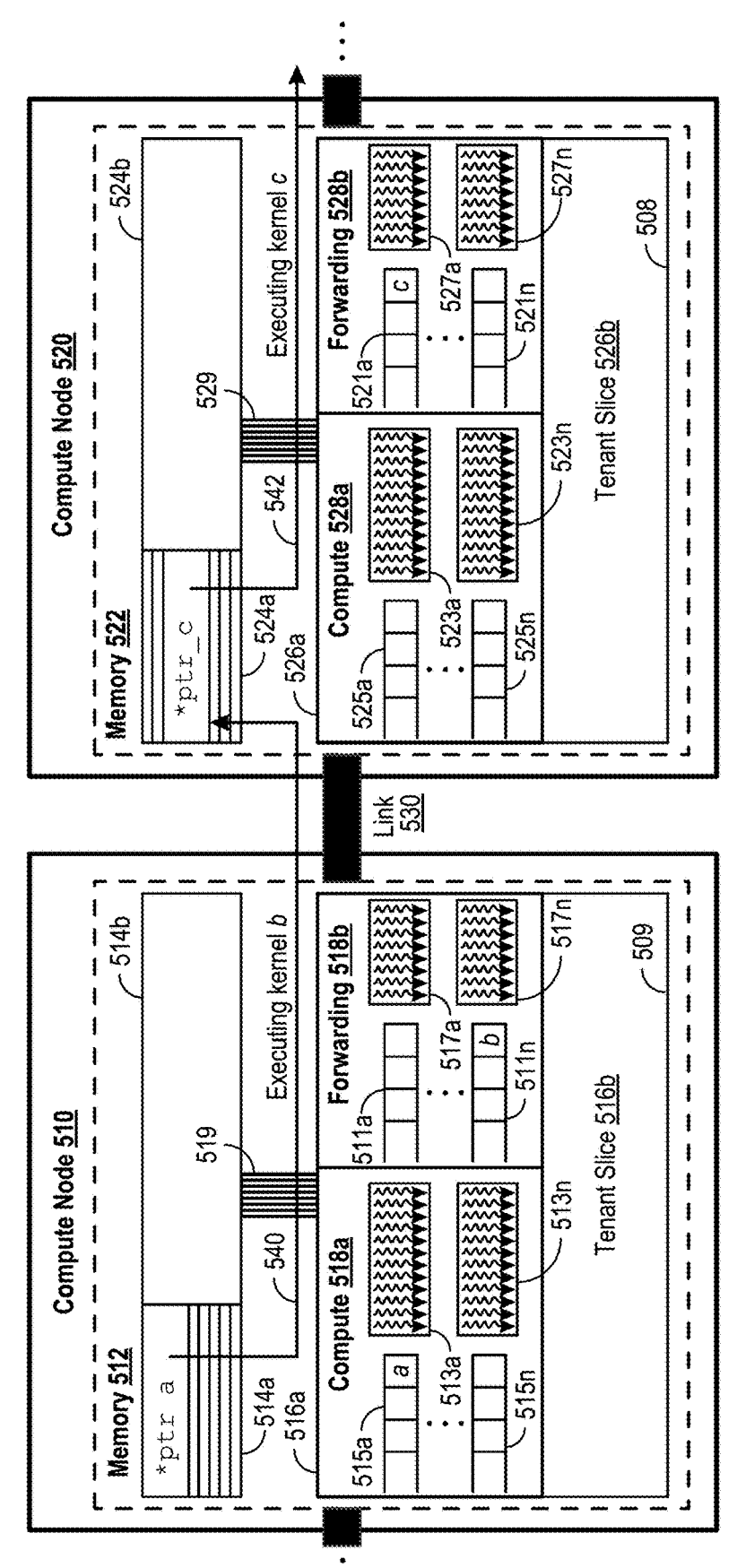
FIG. 5 is a schematic block diagram of an example architecture of compute nodes and MCCF data plane implementation on each compute node of an interconnected system in accordance with the present disclosure.

FIG. 5 is a schematic block diagram of an example architecture of a data plane 500 of an MCCF in accordance with the present disclosure. Data plane 500 may be an example implementation of data plane 220 of FIG. 2. More particularly, data plane 500 comprises a plurality of compute nodes, illustratively shown as compute node 510 and compute node 520 connected via a communication link 530. While FIG. 5 depicts two compute nodes, any number of compute nodes may be included in data plane 500 depending on the physical device topology of an interconnected system in question.

Compute node 510 may comprise memory resources 512 and computation resources 509 connected via an internal connection 519 (e.g., a bus line). The memory resources 512 may be logically partitioned into a first slice 514a of memory resources and a second slice 514b of memory resources. Similarly, computation resources 509 may be partitioned into a first slice 516a and a second slice 516b of computation resources. As described above, an MCCF manager may assign slices of the hardware resources to run MCCF services, while remaining hardware resources may be made available for tasks of a workload. For example, an MCCF manager may assign first slices 514a and 516a to MCCF services (e.g., MCCF slices), while second slices 514b and 516b may be available for allocation to a tenant (e.g., workload). The MCCF Manager can configure and maintain the fraction of hardware resources that each slice occupies. For example, a slice may occupy any fraction of resources from 0% to 100% of the hardware resources.

Compute node 520 may comprise memory resources 522 and computation resources 508 connected via an internal connection 529 (e.g., a bus line). The memory resources 522 may be partitioned into a first slice 524a of memory resources and a second slice 524b of memory resources. Similarly, computation resources 509 may be partitioned into a first slice 526a and a second slice 526b of computation resources. As described above, an MCCF manager may assign first slices 524a and 526a to MCCF services (e.g., MCCF slices), while second slices 524b and 526b may be available for allocation to a workload.

Implementations disclosed herein may apply to most, if not all, compute technologies. As such and for simplicity, the term kernel, as used herein, may refer to any function that an MCCF service can be configured to execute. For example, the MCCF services and slices may be implemented using GPU virtualization technologies. In this case, the MCCF services may execute Compute Unified Device Architecture (CUDA) kernels. Whereas, for CPU nodes, the MCCF services and slices may be realized using CPU virtualization technologies (e.g., KVM) In this case, MCCF executes CPU processes and threads.

As shown in the example of FIG. 5, the second slice 516a may be provided to execute MCCF services. Second slice 516a may be configured to perform compute service 518a and forwarding service 518b. Each MCCF service may comprise one or more pairs of input kernel queues and kernel execution engines. For example, compute service 518a may comprise input kernel queues 515a-515n (collectively referred to herein as internal kernel queues 515) and corresponding kernel execution engines 513a-513n (collectively referred to herein as kernel execution engines 513). Similarly, forwarding service 518b may comprise input kernel queues 511a-511n (collectively referred to herein as internal kernel queues 511) and kernel execution engines 517a-517n (collectively referred to herein as kernel execution engines 517).

The input kernel queues 515 and 511 may be configured to assist with absorbing variations between data arrival rates and service execution rates of kernels (e.g., kernel a, kernel b, etc.). A mapping between a workload's kernels and a given internal kernel queues 515 and 511 can be done and maintained by an MCCF Manager (e.g., MCCF Manager 212 and/or MCCF Manager 300). Once a kernel is dequeued from an internal kernel queue 515 or 511, a corresponding execution engine 513 or 517, respectively, may run the dequeued kernel. For example, when kernel a is dequeued from internal kernel queue 515a, execution engine 513a can run the kernel a. As another example, when kernel b is dequeued from internal kernel queue 511n, execution engine 517n can run the kernel b. Each of kernel execution engines 513 and 517 may be a general-purpose processing unit (e.g., a processor or other computing device) or special-purpose processing unit. The allocation and sizing of internal kernel queues 515 and 511 and kernel execution engines 513 and 517 may be static or dynamic.

Compute node 520 may be similar to compute node 510, in that second slice 526a may be provided to execute MCCF services. Second slice 526a may be configured to perform compute service 528a and forwarding service 528b. Compute service 528a may comprise input kernel queues 525a-525n (collectively referred to herein as internal kernel queues 525) and corresponding kernel execution engines 523a-523n (collectively referred to herein as kernel execution engines 523). Forwarding service 528b may comprise input kernel queues 521a-521n (collectively referred to herein as internal kernel queues 521) and kernel execution engines 527a-527n (collectively referred to herein as kernel execution engines 527).

The input kernel queues 525 and 521 may be configured to assist with absorbing variations between data arrival rates and service execution rates of kernels (e.g., kernel c, etc.). A mapping between a workload's kernels and a given internal kernel queues 525 and 521 can be done and maintained by an MCCF Manager. Once a kernel is dequeued from an internal kernel queue 525 or 521, a corresponding execution engine 523 or 527, respectively, may run the dequeued kernel. For example, when kernel c is dequeued from internal kernel queue 521a, execution engine 527a can run the kernel c. Each of kernel execution engines 523 and 527 may be a general-purpose processing unit (e.g., a processor or other computing device) or special-purpose processing unit. The allocation and sizing of internal kernel queues 525 and 521 and kernel execution engines 523 and 527 may be static or dynamic.

As an illustrative example of the above concepts, input kernel queues 515 and 511 may be represented as a CUDA streams when implemented in the context of CUDA APIs. In this example, an MCCF service may be executed using a grid of GPU thread blocks. In CUDA APIs, CUDA streams and thread blocks of grids can be dynamically configured at runtime, and kernels can be launched on specified CUDA streams with a configured grid of thread blocks.

As described above, MCCF services may comprise a compute service and a forwarding service. A kernel of compute services may run operations, local to an assigned compute node, on one or more data buffers. For example, a kernel a may run operations of the compute service on data buffer "ptr_a" of first slice 514a of memory resources 512. Implementation details may be technology specific; however, at a high level, each compute kernel may be associated with a kernel type (e.g., summation, average, max value, etc.), as well as multiple input data buffers and multiple output data buffers. When data for kernel a arrives at compute node 510, the data can be stored in data buffer "ptr_a" and kernel a placed in an internal kernel queue 515 (e.g., internal kernel queue 515a in this example). When kernel a is dequeued from internal kernel queue 515a, kernel execution engine 513a may be configured to check the kernel type and execute the operation specified by the kernel type. The results of the operation may be held in the data buffer "ptr_a".

In the case of a forwarding service, the kernel of forwarding services may initiate data copying or data transfer between a local data buffer and a remote data buffer. For example, kernel b may be executed to copy or transfer data held in data buffer "ptr_a" to data buffer "ptr_c" of first slice 514a of memory resources 512. When data for kernel b arrives in the data buffer "ptr_a", kernel b may be placed in an internal kernel queue 511 (e.g., internal kernel queue 511n in this example). When kernel b is dequeued from internal kernel queue 511n, kernel execution engine 517n may be configured to check the kernel type and copy or transfer the data according to the kernel type to data buffer "ptr_b" via communication link 530. The data may then be held in the data buffer "ptr_c".

As an illustrative example, consider the compute nodes 510 and 520, which may be non-allocated compute nodes (e.g., compute nodes 402c and 402a of FIG. 4). An MCCF Manager may assign compute nodes 510 and 520 to a virtual topology of the workload to increase the throughput and data transfer rates. The virtual topology may include compute kernel a and forwarding kernel b at compute node 510, and forwarding kernel c at compute node 520. The compute kernel a may be configured to operate on data contained in the data buffer "ptr_a", for example, by adding a fixed value to each element in the buffer. Once compute kernel a is ran by execution engine 513a, the forwarding kernel b may be executed to copy the resulting data to the data buffer "ptr_c" on compute node 520. The forwarding kernel b may execute data transfer 540 to copy the data to data buffer "ptr_c". Similarly, to transfer data to another compute node (not shown in FIG. 5) in the virtual topology, forwarding kernel c may be executed to copy the data buffer "ptr_c" to the next compute node via data transfer 542.

The MCCF services according to the present disclosure may support a wide range of use cases, because the MCCF services enable the MCCF Manager to build any virtual topology for any communication collective. Three illustrative examples are provided below as a non-exhaustive list of these use cases.

In a first example use case, suppose a workload is allocated two compute nodes that will run an All-Reduce collective. Since the two nodes may have limited or relatively slow direct bandwidth, a virtual topology may be constructed that spans multiple indirect communication links to increase the bandwidth (e.g., indirect communication path 118 of FIG. 1). In this case, the All-Reduce collective can be performed such that each allocated compute node performs a reduction functionality (e.g., aggregation) and can communicate resulting values to each of the allocated compute nodes via an indirect communication path 118, which may offer improved data transfer rates over the direct communication path.

As a second example use case, communication time may be reduced by utilizing additional N non-allocated compute nodes between sending and receiving compute nodes (e.g., allocated compute nodes). For example, a sending compute node may perform a Scatter (or partition) collective that partitions data traffic among the N non-allocated compute nodes. The receiving compute node may then execute a gather collective to gather partitioned data from the N non-allocated compute nodes. Total time between sending and receiving the data can be reduced due to partitioning of the data into to smaller portions and simultaneously transmitting the smaller portions to the receiving compute node via the N non-allocated compute nodes.

Aa a third example use case, the MCCF services may be used as a parameter server for a fraction of a data traffic stream. In this case, a non-allocated compute node may receive a fraction of the data traffic and perform local reduction through the MCCF compute service. The non-allocated compute node may then broadcast the reduced data traffic back to the allocated compute nodes.

FIG. 6 illustrates an example computing component that may be used to implement multi-tenant collective communication in distributed computing in accordance with various embodiments. Referring now to FIG. 6, computing component 600 may be, for example, a server computer, a controller, or any other similar computing component capable of processing data. In the example implementation of FIG. 6, the computing component 600 includes a hardware processor 602, and machine-readable storage medium for 604.

Hardware processor 602 may be one or more central processing units (CPUs), semiconductor-based microprocessors, and/or other hardware devices suitable for retrieval and execution of instructions stored in machine-readable storage medium 604. Hardware processor 602 may fetch, decode, and execute instructions, such as instructions 606-612, to control processes or operations for multi-tenant collective communication in distributed computing. As an alternative or in addition to retrieving and executing instructions, hardware processor 602 may include one or more electronic circuits that include electronic components for performing the functionality of one or more instructions, such as a field programmable gate array (FPGA), application-specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-612.

Hardware processor 602 may execute instruction 606 to allocate a plurality of compute nodes of an interconnected system to a first workload. In some examples, instruction 606 may include assigning compute and memory slices on the allocated nodes to the first workload.

Hardware processor 602 may execute instruction 608 to obtain a topology of the interconnected system. The topology may be representative of an indirect communication path between the plurality of allocated compute nodes. The indirect communication path may comprise a non-allocated compute node of the interconnected system.

Hardware processor 602 may execute instruction 610 to create a plurality of slices of hardware resources of the non-allocated compute node. The first slice of the plurality of slices may be dedicated to processing and forwarding data traffic along the indirect communication path. The second slice of the plurality of slices may be configured for allocation to a second workload.

Hardware processor 602 may execute instruction 612 to execute the first workload by the plurality of allocated compute nodes and the non-allocated compute node. The data traffic from the plurality of allocated compute nodes can be communicated via the indirect communication path.

Figure 7:
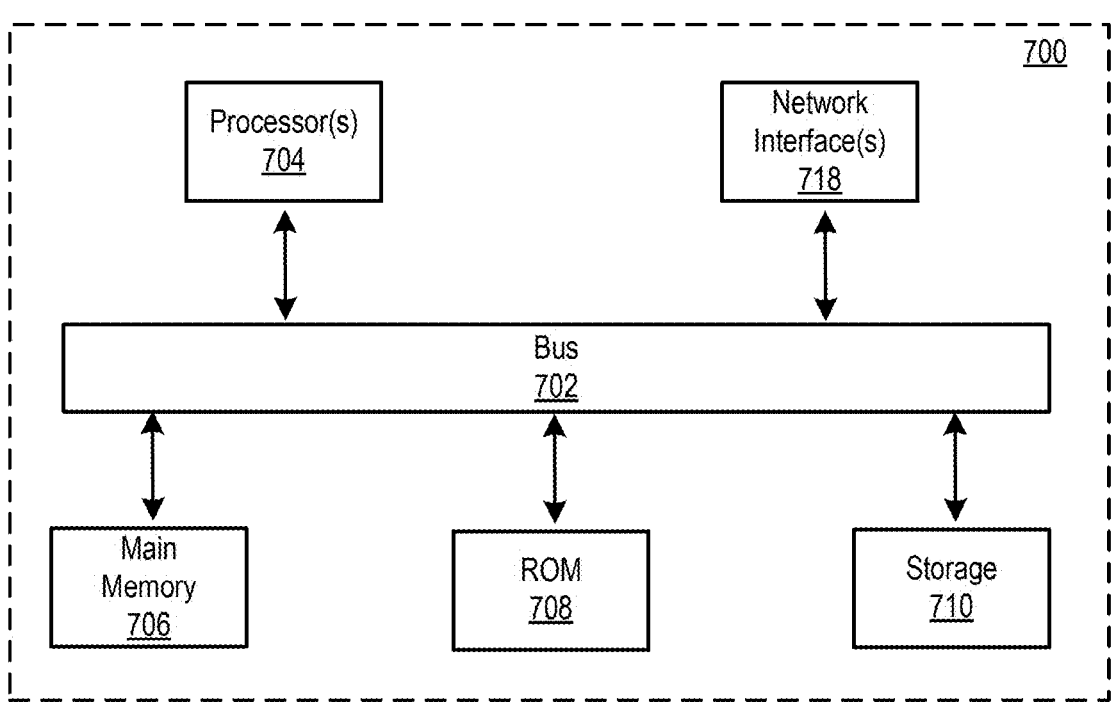
FIG. 7 is an example computer system that may be used to implement various features of multi-tenant collective communication in distributed computing of the present disclosure.

FIG. 7 depicts a block diagram of an example computer system 700 in which various of the embodiments described herein may be implemented. 700 may be an example implementation of any of the components disclosed herein, for example, first compute nodes 102, third compute nodes 104, switches 106, and/or second compute nodes 108 of FIG. 1; MCCF Manager 212 and/or compute nodes 224 of FIG. 2; MCCF Manager 300 of FIG. 3; and compute node 510 and/or compute node 520 of FIG. 5.

The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random-access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read-only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for multi-tenant collective communication in distributed computing, the method comprising:

allocating a plurality of compute nodes of an interconnected system to a first workload;

obtaining a topology of the interconnected system, the topology representative of an indirect communication path between the plurality of allocated compute nodes, wherein the indirect communication path comprises a non-allocated compute node of the interconnected system;

creating a plurality of slices of hardware resources of the non-allocated compute node, a first slice of the plurality of slices is dedicated to processing and forwarding data traffic along the indirect communication path, and a second slice of the plurality of slices configured for allocation to a second workload; and executing the first workload by the plurality of allocated compute nodes and the non-allocated compute node, wherein data traffic from the plurality of allocated compute nodes is communicated via the indirect communication path.

2. The method of claim 1, wherein the indirect communication path comprises a plurality communication links between the non-allocated compute node and the plurality of allocated compute nodes.

3. The method of claim 2, wherein the plurality of communication links comprises a data transfer rate that is higher than a communication link of a direct communication path that connects the plurality of allocated compute nodes.

4. The method of claim 2, wherein a direct communication path between the plurality of allocated compute nodes is not available.

5. The method of claim 1, further comprising:

receiving a resource allocation request, the resource allocation request comprising information requesting a number of compute nodes the interconnected system for executing the first workload, wherein the allocating the plurality of compute nodes is based on the requested number of compute nodes.

6. The method of claim 5, wherein the resource allocation comprises a communication criteria between the plurality of allocated compute nodes.

7. The method of claim 1, further comprising:

identifying a direct communication path between the plurality of allocated compute nodes;

identifying the indirect communication path;

determining that the indirect communication path comprises a second data transfer rate that is optimal relative to a first data transfer rate of the direct communication path; and generating the topology based on the determination.

8. The method of claim 1, wherein the interconnected system comprises a physical device topology, the physical device topology comprising the plurality of compute nodes and a plurality of communication links, wherein the obtained topology is a virtual topology for executing the first workload.

9. The method of claim 1, wherein executing the first workload comprises:

communicating first data traffic from a first allocated compute node of the plurality of allocated compute nodes to the non-allocated compute node via the indirect communication path; and forwarding second data traffic to a second allocated compute node of the plurality of allocated compute nodes using hardware resources of the non-allocated compute node corresponding to the first slice, the second data traffic is based on the first data traffic.

10. The method of claim 9, wherein executing the first workload comprises:

processing the first data traffic second to produce the second data traffic using hardware resources of the non-allocated compute node corresponding to the first slice.

11. The method of claim 1, further comprising:

assigning compute and memory slices on the plurality of allocated compute nodes to the first workload.

12. A system, comprising:

a memory configured to store instructions; and at least one processor communicatively coupled to the memory and configured to execute the instructions to:

allocate a plurality of compute nodes of an interconnected system to a first workload;

obtain a topology of the interconnected system, the topology representative of an indirect communication path between the plurality of allocated compute nodes, wherein the indirect communication path comprises a non-allocated compute node of the interconnected system;

create a plurality of slices of hardware resources of the non-allocated compute node, a first slice of the plurality of slices is dedicated to processing and forwarding data traffic along the indirect communication path, and a second slice of the plurality of slices configured for allocation to a second workload; and execute the first workload by the plurality of allocated compute nodes and the non-allocated compute node, wherein data traffic from the plurality of allocated compute nodes is communicated via the indirect communication path.

13. The system of claim 12, wherein the indirect communication path comprises a plurality communication links between the non-allocated compute node and the plurality of allocated compute nodes.

14. The system of claim 12, wherein the at least one processor is further configured to execute the instructions to:

receive a resource allocation request, the resource allocation request comprising information requesting a number of compute nodes the interconnected system for executing the first workload, wherein the allocating the plurality of compute nodes is based on the requested number of compute nodes.

15. The system of claim 12, wherein the at least one processor is further configured to execute the instructions to:

identify a direct communication path between the plurality of allocated compute nodes;

identify the indirect communication path;

determine that the indirect communication path comprises a second data transfer rate that is optimal relative to a first data transfer rate of the direct communication path; and generate the topology based on the determination.

16. The system of claim 12, wherein the interconnected system comprises a physical device topology, the physical device topology comprising the plurality of compute nodes and a plurality of communication links, wherein the obtained topology is a virtual topology for executing the first workload.

17. The system of claim 12, wherein the at least one processor is further configured to execute the instructions to:

communicate first data traffic from a first allocated compute node of the plurality of allocated compute nodes to the non-allocated compute node via the indirect communication path; and forward second data traffic to a second allocated compute node of the plurality of allocated compute nodes using hardware resources of the non-allocated compute node corresponding to the first slice, the second data traffic is based on the first data traffic.

18. An interconnected compute system, comprising:

a plurality of communications links;

a first plurality of compute nodes configured to be allocated to a first workload; and a second compute node connected to a first subset of communication links, wherein the first subset of communications links forms a first communication path that comprises the first plurality of compute nodes and the second compute node, wherein the second compute node comprises hardware resources partitioned into a plurality of slices, a first slice of the plurality of slices is configured to be dedicated to transferring data traffic of the first workload to the first plurality of compute nodes via the first subset of communication links.

19. The interconnected system of claim 18, wherein the plurality of communication links comprises a second plurality of communication links that forms a second communication path, the second communication path directly connecting the first plurality of compute nodes.

20. The interconnected system of claim 18, wherein the plurality of slices comprises a second slice configured to be allocated to a second workload.

* * * * *